No. 12,274. REISSUED OCT. 11, 1904.
F. E. KIP.
ELECTRICAL WARP STOP MOTION FOR LOOMS.
APPLICATION FILED AUG. 13, 1904.
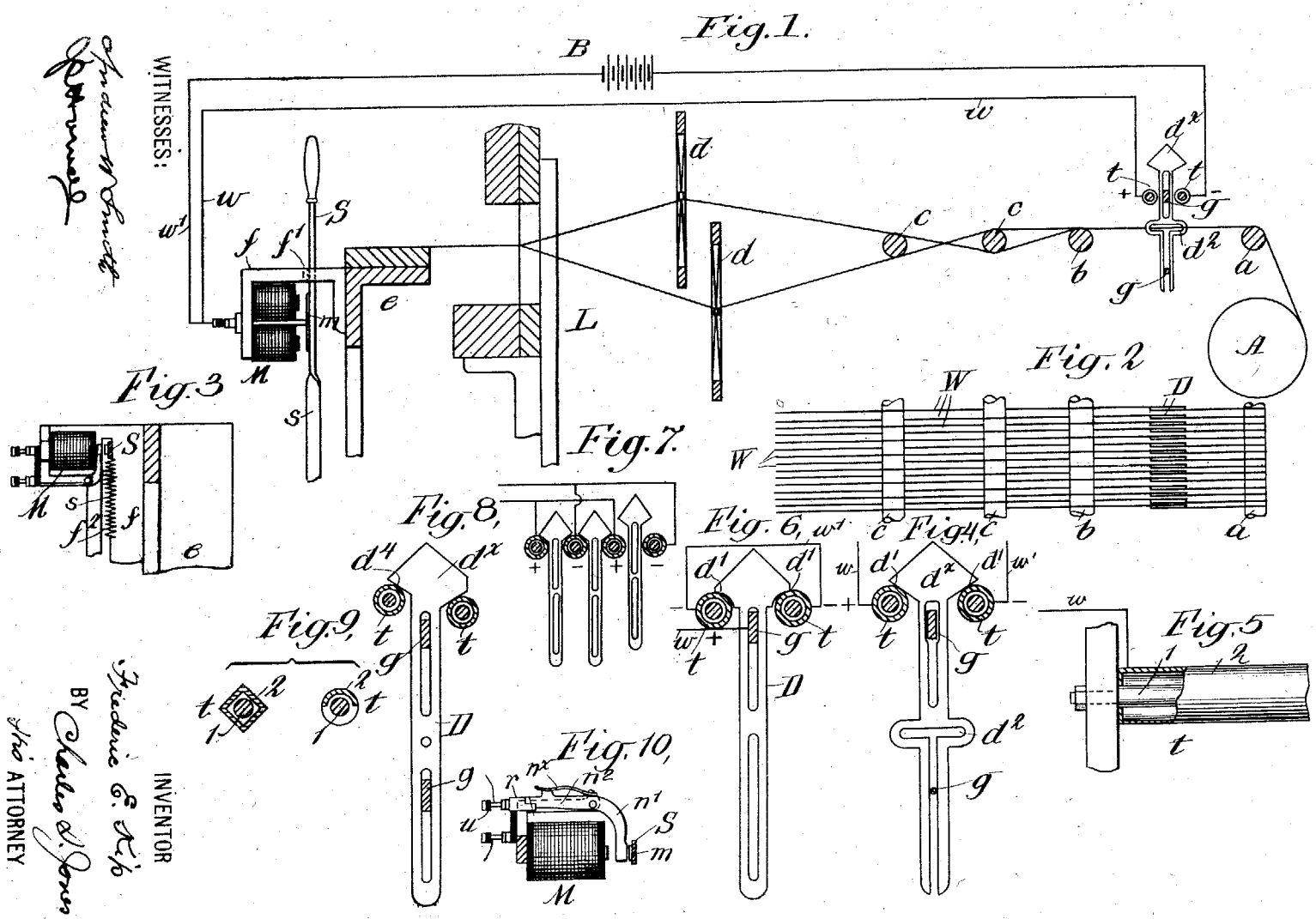
WITNESSES:
Andrew W. Smith
J. A. Howell
INVENTOR
Frederic E. Kip
BY Charles D. Jones
His ATTORNEY No. 12,274. Reissued October 11 1904.

UNITED STATES PATENT OFFICE.

FREDERIC E. KIP, OF MONTCLAIR, NEW JERSEY, ASSIGNOR TO THE KIP-ARMSTRONG COMPANY, A CORPORATION OF NEW YORK.

ELECTRICAL WARP STOP-MOTION FOR LOOMS.

SPECIFICATION forming part of Reissued Letters Patent No. 12,274, dated October 11, 1904.

Original No. 621,575, dated March 21, 1899. Application for reissue filed August 13, 1904. Serial No. 220,683.

*To all whom it may concern:*

Be it known that I, FREDERIC E. KIP, a citizen of the United States, residing at Montclair, Essex county, New Jersey, have invented certain new and useful Improvements in Electrical Warp Stop-Motions for Looms, of which the following is a specification.

This invention relates to the class of devices for effecting the automatic stopping of the loom when any warp-thread breaks, and while the present invention is applicable to any ordinary loom it is especially adapted to the class of looms used in weaving velvets, plushes, and the like, which employ two back warps and a pile-warp and sometimes employing nearly eight thousand warp-threads. In these looms especially the spaces measured from front to back of the loom in which the terminal drops may be set are very limited. Hence one of the objects of the present invention is to provide a narrow vertically-arranged terminal drop which will occupy little space and which by reason of the circuit-closing contact being above the warp will be kept free from fluff and lint, which is liable to collect on the stationary terminal and prevent electrical contact when the light drop falls thereon. In connection with this feature the stationary contact-terminals are so constructed as to maintain their form and not bend when the frame of the loom in which they are mounted springs in working or vibrating, and preferably, also, the contact is made by vertical pressure of the drop on the fixed contact.

Another object of the invention is to apply the magnet which controls the shipper-lever directly to the said lever, so as to avoid reliance on the going pa or vibrating mechanism of the loom for the release of the lever from its retaining-notch.

In the accompanying drawings, which serve to illustrate the invention, Figure 1 is a diagrammatic view in the form of a sectional side elevation, illustrating the stop-motion. Fig. 2 is a plan view of a part of the mechanism seen in Fig. 1, showing the terminal drops in plan; and Fig. 3 is an under side plan view of another part of Fig. 1, showing the magnet and shipper-lever. Fig. 4 is an enlarged view of one of the terminal drops shown resting on and in contact with the two stationary terminals. Fig. 5 is a fragmentary detail view showing the tubular construction of the stationary terminal. Fig. 6 illustrates an arrangement of the circuit where the stationary terminals are of the same polarity, and Fig. 7 is a view showing how one stationary terminal may serve for two series of terminal drops. Figs. 8 and 9 illustrate slight modifications, which will be hereinafter described. Fig. 10 is a plan view illustrating the switch or circuit-breaker at the operating-magnet.

Referring primarily to Figs. 1 to 5, A represents the warp-beam of a loom; W, the warp; *a* and *b*, rollers over which the warp passes; *c*, the lease-rods; *d*, the heddles; L, the lathe; *e*, the breast-beam; S, the shipper-lever for stopping and starting the loom, and *f* the slotted bracket in which the lever S plays. The shipper-lever as ordinarily arranged has a spring *s*, which actuates the lever to shift the belt which runs the loom, and while the loom is running the lever is held by a slight retaining-shoulder $f'$, Fig. 3, at the side of the guide-slot $f^2$ in the bracket *f*, and if lateral pressure or pull be applied to the lever sufficient to free it from said shoulder the spring *s* acts to instantly shift the lever, and thus stop the loom.

B is an electrical generator, which may be a battery, and *w w'* are conductors forming a circuit supplied by said generator, the conductors leading, respectively, from the positive and negative poles of the battery. In the circuit is a magnet M, mounted on some part of the frame adjacent to the shoulder $f'$, which retains the shipper-lever S and having its poles presented to the retained lever. On the lever S is the armature *m* of the magnet, said armature being situated in front of and within attracting distance of the poles of the magnet. Obviously when the magnet is excited by the closing of the electric circuit it will attract the armature *m*, and thus draw the lever S out laterally until it is free from its retaining-shoulder $f'$, when the spring *s* will shift it. The looseness of the lever at its pivotal point or fulcrum below may be relied on to allow of the very slight lateral movement required to free the upper end of the lever from its retaining-shoulder. This construction obviates the necessity of employing more or less complicated devices between the shipper-lever and the controlling-magnet and also obviates reliance on some vibrating or going part of the loom for freeing the shipper-lever.

Preferably there will be a switch whereby the armature of the shipper-lever when it is attracted by the magnet M will automatically break the circuit, and thus cause the magnet to release the lever, so that it may shift freely. Any form of switch will serve the purpose; but as here shown it consists of an elbow-lever $n'$ $n^2$, mounted on a branch $o$ of the metal frame of the magnet, this branch being in the circuit. One arm, $n'$, of the lever extends across in front of the poles of the magnet, between them and the armature $m$, and the other arm, $n^2$, is, between the metal frame $o$ and a metal finger $r$, connected electrically with the insulated binding-post $u$. The current flows from this post through the finger $r$, interposed arm $n^2$, and frame $o$ to the coil of the magnet; but when the magnet is excited and attracts the armature $m$ the latter strikes the arm $n'$ of the switch-lever, moves it in toward the poles of the magnet, and simultaneously moves the other arm, $n^2$, out of contact with the finger $r$, thus breaking the circuit. Thus the action of the magnet in releasing the shipper-lever is only momentary; but it suffices to free said lever, so that the spring $s$ may act on it. After the lever has shifted and is out of the way a spring $n^\times$ serves to return the lever to its normal position, with the arm $n^2$ thereof in contact with the finger $r$.

The means employed for closing the circuit when a warp-thread breaks will now be described.

D is one of a series of upright slender circuit-closing drops supported on the respective warp-threads, each drop having a longitudinally-slotted body and a broad head $d^\times$. The warp-thread passes through a slot or eye in the body, and guide-rods $g$, extending across the loom and through the respective slots in the body thereof, serve to maintain the drop in an upright position at all times. Two contact-terminals $t$ extend across the loom at the respective sides of the body of the drop D and in such a position that when the drop falls from the breaking of the warp-thread which supports it two shoulders $d'$ on the head $d^\times$ impinge and rest upon said terminal $t$, which latter now supports the drop. The transverse terminals $t$ are connected electrically with the respective conductors $w$ and $w'$, and hence the head of the drop serves to close the circuit and energize the magnet M.

The drops D will be made of thin sheet metal and rather narrow, as shown, so as to occupy very little space measured lengthwise of the warp, and this is very important in some looms where the space available for the drops is exceedingly restricted. It is also important in that it facilitates the division of the drops D into several series, as designated in Fig. 7, where three of such series are shown—that is, each series contains one-third of the drops, the total number equaling, of course, the number of threads in the warp. In Fig. 7 also is illustrated another feature—namely, the utilization of one contact-terminal $t$ for two adjacent series of drops D. In this case alternate terminals $t$ are coupled up to one of the circuit-conductors.

Fig. 6 illustrates an arrangement of the circuit wherein the drop D, through its permanent sliding contact with a guide rod or bar $g$, becomes a terminal contact, the two terminals $t$ being in this case connected with one of the conductors, as $w'$, and rod or bar $g$ with the other conductor. This construction is not deemed so reliable as the one shown in the principal figures for the reason that the contact of the drop with the rod $g$ in Fig. 6 is necessarily lateral, while both of the contacts in the principal construction are vertical, and thus rendered more reliable by the weight and momentum of the falling drop.

Figs. 1 and 4 show the drop in the form preferred—that is, with a transverse slot $d^2$ to receive the warp-thread, which is entered by an open slot at the bottom. The lower guide-rod $g$ may be a strained wire; but the upper one will be by preference a flat strip or bar which fits rather snugly in the narrow part of the slot in the drop; but the upper part of this slot may be widened a little, Figs. 1 and 4, so that when the drop falls the upper flat guide-rod will enter this widened part of the slot a moment before the shoulders $d'$ strike the two terminals $t$. The purpose of this is to leave the drop free of the guide-rod, so that it may adjust itself to the terminals $t$.

Respecting the contact-terminal $t$ it is preferred to construct it as best illustrated in the detail view, Fig. 5. A bar or rod 1 extends across the loom-frame and is rigidly fixed at its ends in said frame. On this rod is loosely mounted a straight metal tube 2, which has bearings only at its ends on the rod 1 and these preferably near the side frame of the loom. The tube 2 is the actual contact-piece, and the purpose of the construction is to prevent the slight buckling or bending of the rod 1 from bending the tube 2 out of line also, and thus, perhaps, preventing proper contact of the head of the drop D with the terminal contact $t$ when said drop falls.

It will be noted that in the constructions herein shown the contacts are all above the warp, and therefore are not liable to be covered with fluff or lint from the fibrous threads.

Such fluff and lint being practically non-conducting, it is liable to prevent electrical connection between the terminals when a drop falls. As practically all the lint accumulates below the level of the warp-threads, it is obvious that the difficulty of proper contact will be overcome by having the contact-point above the warp.

Preferably the contact-shoulders $d'$ on the head of the drop D will be inclined, as in Figs. 1 and 4, or slightly concave, as in Fig. 6. These inclines provide a slight rubbing contact and a wedging action which insures contact with both of the terminals $t$. The drops slide freely on the guide-rods $g$.

It will be readily understood that parts of the loom-frame may form parts of the circuit if proper precaution be taken to insulate as required.

Respecting the terminal $t$ (shown in Fig. 5) it may be said that while the contact-piece 2 will be by preference and for convenience a tube it is not absolutely essential that it should be a complete tube nor a cylindrical tube, as the contact is made only on its top. Fig. 9 illustrates two modified forms of the piece 2—one a square tube and the other of a semicylindrical form. Fig. 8 shows a slight modification of the drop and the terminals $t$. In this view the terminals are placed side by side; but one is a little lower than the other, the shoulders on the drop being consequently formed one a little lower than the other, so that both shoulders will come into contact at the same time when the drop falls.

It has been stated in the foregoing specification that the terminals $t$ extend across the loom, and preferably they will extend entirely across the loom and have bearings on the side frames thereof; but the word "across" is used merely in the sense of crosswise or transversely of the loom, and it will be understood by those skilled in the art that it is only necessary that the terminals $t$ shall extend across the warp whether it be set the full width of the loom or not.

Having thus described my invention, I claim—

1. The combination with the shipper-lever of a loom, its actuating-spring and a retaining-shoulder engaged by said lever, of an electrical warp stop-motion, consisting of an electric circuit, a generator which supplies said circuit, means for closing said circuit automatically when a warp-thread breaks, a magnet in said circuit and fixed in a position with its poles adjacent to an armature carried by the retained shipper-lever, and the said armature, the line of pull of the magnet being perpendicular to the path followed by the lever when freed, and said pull being in the direction to free the lever from its retaining-shoulder, substantially as and for the purpose set forth.

2. In an electrical warp stop-motion, the combination with an operating electric circuit having its terminals extending across the warp, side by side, and the drops D, made from thin sheet metal with a relatively long, narrow body pendent between said terminals, and provided with a head which is broader than the body and furnished with inclined shoulders, $d'$, said drop having two longitudinal guide-slots one above the other and an aperture for the warp-thread below the upper guide-slot, of the transverse guides, one above and one below the aperture for the warp-thread, said guides engaging the guide-slots in the drop, substantially as set forth.

3. In an electrical warp stop-motion, the combination with an operating electric circuit having its terminals extending across the warp, side by side, and the drop-guides $g$, situated below said terminals and one above the other, of a series of drops D, each made of thin sheet metal with a relatively long, narrow body pendent between said terminals and slotted to receive the said guides and the warp-thread, said drop having at its upper end two lateral shoulders to take over the respective terminals and having its lower guide-slot open at its lower end to receive the warp-thread and open at its upper end to the aperture through which the warp-thread passes, substantially as set forth.

4. A terminal drop D, having a broad head $d^{\times}$, shoulders $d'$, a transverse slot $d^{2}$, for the warp-thread, and longitudinal slots to receive transverse guides, substantially as set forth.

5. A terminal drop D, having shoulders $d'$, and longitudinal slots to receive transverse guides, the upper guide-slot being widened at its upper part, substantially as and for the purposes set forth.

6. In an electrical warp stop-motion for looms, the combination with an operating electric circuit, each conductor of which has a series of contact-terminals extending transversely of the loom, side by side, those of one polarity alternating with those of the other polarity, of circuit-closing drops, arranged in series between adjacent circuit-terminals and supported on the warp-threads, each of said drops having two shoulders adapted to make electric contact with two terminals of the circuit when the drop falls, substantially as set forth.

7. In an electrical warp stop-motion for looms, the combination with the loom-frame having the transverse rods 1, fixed therein, the normally open, operating electric circuit, having tubular terminals 2, mounted loosely on the respective rods 1, at their respective ends only, whereby distortion of the loom-frame is prevented from bending said terminals, and the drops D, adapted to close the circuit at said terminals when a warp-thread breaks, substantially as set forth.

8. A drop device for warp stop-motions having means by which it may be suspended from a warp-thread, and means for making contact above the warp-thread.

9. A drop device for warp stop-motions having means by which it may be suspended from a warp-thread, and a projection extending from the body thereof for making contact above the warp-thread.

10. A drop device for warp stop-motions formed of sheet metal having a longitudinally-slotted body and a contact projection extending from said body.

11. A drop device for warp stop-motions formed of sheet metal having an elongated body with two slots, one of which is open at one end and the other closed at both ends.

12. A warp stop-motion for looms comprising drop devices maintained in normal position by unbroken warp-threads, said drop devices being formed of sheet metal and having an elongated body with two slots, one of which is open at one end and the other closed at both ends, a normally open electric circuit adapted to be closed by a falling drop, and loom-stopping mechanism actuated upon the closing of the circuit.

13. A warp stop-motion for looms, comprising drop devices suspended from and maintained in normal position by unbroken warp-threads, said drop devices having a projection extending from the body thereof above the warp, a normally open electric circuit adapted to be closed by a falling drop, and loom-stopping mechanism actuated upon the closing of the circuit.

14. A warp stop-motion for looms, comprising drop devices maintained in normal position by unbroken warp-threads, said drop devices having a longitudinally-slotted body and a projection extending from said body, a normally open electric circuit adapted to be closed by a falling drop, and loom-stopping mechanism actuated upon the closing of the circuit.

15. A warp stop-motion for looms, comprising drop devices suspended from and maintained in normal position by unbroken warp-threads, said drop devices having a projection extending from the body portion thereof above the warp, an electric circuit having terminals in the path of a falling drop, whereby the circuit is closed by said drop, said drop contacting with a terminal through the projecting part thereof, the point of contact of said terminal and projecting part being outside of the line of descent of the body part of the drop, and loom-stopping means actuated upon the closing of the circuit.

16. A warp stop-motion for looms comprising drop devices maintained in normal position by unbroken warp-threads, said drop devices having a longitudinally-slotted body and a projection extending from said body, an electric circuit having terminals in the path of a falling drop, whereby the circuit is closed by said drop, said drop contacting with a terminal through the projecting part thereof, the point of contact of said terminal and projecting part being outside of the line of descent of the body part of the drop, and loom-stopping means actuated upon the closing of the circuit.

In testimony whereof I have signed my name to this specification in the presence of two subscribing witnesses.

FREDERIC E. KIP.

Witnesses:
FRANK F. OSMERS,
GEORGE SULLIVAN.